3,321,829
BRAZING FLUX AND METHOD OF BRAZING WITH SAME

John A. Scott, North Haven, Conn., assignor to Olin Mathieson Chemical Corporation, a corporation of Virginia
No Drawing. Filed May 12, 1964, Ser. No. 366,916
12 Claims. (Cl. 29—495)

The present invention relates to an improved brazing flux for use with copper base alloys, especially aluminum bronzes and to a brazed article and a process for brazing in connection therewith.

In conventional brazing processes a readily fusible metal or filler metal is provided between the members to be joined. In the presence of a suitable flux the assembled members and fusible metal are heated to a temperature at which the fusible metal melts and wets the surface of the solid members to be joined; but very little, if any fusion of said solid members occurs. Upon cooling the liquid metal solidifies and establishes a joint between the members. It has been considered necessary to employ a flux to cleanse the surface to be brazed and to wash away any oxide residue where the members to be joined are susceptible of forming an oxide film thereon, such as members with a significant aluminum content. No pressure is applied to the joint other than that which may be needed to maintain the assembly in the desired position during the brazing operation.

In this process the bonding or filler metal must necessarily have a lower melting point than that of the abutting members and they must retain their integrity to form the the desired joint. The bonding metal, of course, remains between the joined members. In addition, any flux residue should be removed in order to avoid any corrosive effect.

The problem of establishing a firm joint between the members to be joined is particularly acute with members having a significant aluminum content because of the tenacious oxide film which occurs on the surface of aluminum or alloys which contain a reasonable amount thereof.

The present invention is particularly directed to the brazing of copper base alloys containing at least 5 percent aluminum and preferably aluminum bronzes containing from 9.0 to 11.8 percent aluminum. Conventional copper brazing fluxes do not effectively promote filler metal flow on these alloys in an air atmosphere. The inability of these fluxes to work effectively on these copper-aluminum alloys is caused by the surface oxide that forms thereon as a result of the aluminum content of the alloy. If the oxide is not removed under the conditions of brazing, the filler metal cannot flow over these base metal surfaces and thus joining by brazing is impossible.

Conventionally various methods have been proposed for joining copper base alloys containing significant quantities of aluminum. These methods either (1) do not provide effective bonds or (2) are cumbersome or inconvenient or frequently expensive.

In addition, the aluminum content of the copper-aluminum alloys requires special consideration in the brazing process because of the aforementioned refractory nature of the surface oxide caused by the aluminum content of the alloys. As a result, a suitable brazing flux cannot function in a dual role and be capable of providing the mechanism for removing surface oxide as on an aluminum base alloy, as well as providing the necessary functions of a brazing flux for a copper alloy.

Accordingly, it is an object of the present invention to provide a brazing flux which readily is amenable for use with copper base alloys containing at least 5 percent aluminum.

It is a further object of the present invention to provide a brazed article utilizing the aforesaid improved brazing flux and a process for brazing.

It is a particular object of the present invention to provide a brazing flux which effectively, conveniently, and inexpensively brazes copper base alloys containing at least 5 percent aluminum.

Further objects and advantages of the present invention will appear hereinafter.

In accordance with the present invention it has now been found that the foregoing objects and advantages thereof may be readily obtained and an improved brazing flux provided which comprises a mixture of the following ingredients, wherein the percentages are by weight: from 10 to 70 percent of at least one alkali metal halide; from 0.4 to 10 percent of a zinc halide; from 4 to 20 percent of boron oxide; and from 20 to 75 percent of potassium borate. Preferably, the brazing flux of the present invention comprises a mixture of the following ingredients, wherein the percentages and ratios are weight percentages and weight ratios:

(A) one part sodium halide in an amount from 2 to 21 percent and preferably from 4 to 19 percent;
(B) from 1.4 to 3 parts potassium halide in an amount from 5 to 42 percent and preferably from 1.6 to 2.5 parts in an amount from 8 to 39 percent;
(C) from 0.1 to 0.6 parts lithium halide in an amount from 0.4 to 10 percent, and preferably from 0.2 to 0.5 parts in an amount from 1 to 7 percent;
(D) from 0.1 to 0.6 part zinc halide in an amount from 0.4 to 10 percent, and preferably from 0.2 to 0.5 part in an amount from 1 to 7 percent;
(E) from 0.2 to 5 parts boron oxide in an amount from 4 to 20 percent, and preferably from 0.3 to 4 parts in an amount from 5 to 18 percent; and
(F) from 1.25 to 15 parts potassium borate in an amount from 20 to 75 percent, and preferably from 1.4 to 14 parts in an amount from 25 to 70 percent.

The brazing flux of the present invention may be used as a dry paste, but preferably in practice water is added to obtain the most desirable fluidity for the particular brazing operation being conducted.

The preferred halides are the chlorides, with the exception that in the brazing flux of the present invention at least one fluoride should preferably be provided. The fluoride is normally provided as lithium fluoride.

It should be understood that the brazing flux of the present invention may contain other elements or compounds than those mentioned above, either in lesser or greater amounts. These additional compounds may occur as normal impurities in the substituents of the present brazing flux or may be intentionally added in order to provide additional beneficial properties to the functioning of the flux. Wetting agents may also be added to aqueous mixtures of the flux in order to facilitate flow and spread on the work piece during application.

The process of the present invention comprises applying the aforesaid flux and a filler metal to the surface of the copper base alloy members to be joined, said members comprising a copper base alloy containing at least 5 percent aluminum, placing the members and interposed flux and filler metal into an assembly in intimate contacting relationship and heating the assembly to a temperature above the melting point of the filler metal but below the melting point of the copper base alloy. The resulting joined article is characterized by excellent properties and a good physical bond.

The particular characteristics of the brazing flux of the present invention may be varied within a wide range within the aforesaid critical requirements thereof. The exact proportion of ingredients in the brazing flux of the present invention may vary within the aforesaid ratio and the optimum proportions will vary depending upon the particular aluminum content of the copper base alloy and on the particular requirements of the brazing process. Exemplicative flux compositions are given below:

*Composition A*

| | Percent |
|---|---|
| NaCl | 5.0 |
| KCl | 9.0 |
| LiF | 1.0 |
| ZnCl$_2$ | 1.5 |
| B$_2$O$_3$ | 16.0 |
| KBO$_2$ | 67.5 |

*Composition B*

| | |
|---|---|
| NaCl | 9.0 |
| KCl | 15.0 |
| LiCl | 4.0 |
| LiF | 2.5 |
| ZnCl$_2$ | 3.0 |
| B$_2$O$_3$ | 12.5 |
| KBO$_2$ | 54.0 |

*Composition C*

| | |
|---|---|
| NaCl | 18.0 |
| KCl | 38.0 |
| LiF | 5.2 |
| ZnCl$_2$ | 5.3 |
| B$_2$O$_3$ | 6.3 |
| KBO$_2$ | 27.0 |
| Mg$_3$(BO$_3$)$_2$ | 0.2 |

The above compositions should in no way be considered as restrictive of the present invention but merely illustrative and representative of compositions that can be used within the scope of this invention.

In utilizing the flux of the present invention neither the brazing temperature nor the brazing time is critical. Similarly, the particular filler metal which may be employed may be varied within a wide range and in fact any filler metal may be utilized which has a melting point above the melting point of the brazing flux and below the melting point of the base metal. Representative filler metals which may be utilized with the present invention are the following:

| Filler Metal Designations | Nominal Composition, Percent | | | | | |
|---|---|---|---|---|---|---|
| | Cu | Ag | P | Zn | Cd | Ni |
| F-1 | 95 | | 5 | | | |
| F-2 | 93 | | 7 | | | |
| F-3 | 89 | 5 | 6 | | | |
| F-4 | 26 | 35 | | 21 | 18 | |
| F-5 | 30 | 40 | | 28 | | 2 |
| F-6 | 20 | 70 | | 10 | | |
| F-7 | 52.5 | | | 47.5 | | |

The above list of filler metals is by no means exhaustive and it should not be construed that the present invention is limited to the filler metals listed.

The brazing time is not restrictive since the brazing cycle depends upon a combination of time, temperature, and size of the assembly being brazed.

Any copper base alloy containing at least 5 percent aluminum may be readily employed in the present invention. In the preferred embodiment the present invention is applicable to those copper base alloys or aluminum bronzes containing from 9.0 to 11.8 percent aluminum described in co-pending patent application Ser. No. 328,184 by George H. Eichelman, Jr., and Irwin Broverman filed Dec. 5, 1963 and Ser. No. 341,121 by George H. Eichelman, Jr. and Irwin Broverman filed Jan. 29, 1964. In the preferred embodiment the process of the present invention is applicable to the aluminum bronze alloys described in the aforesaid copending applications including the alloys after the detailed process treatments of said co-pending patent applications. The reason for this preference is due to the exceptional properties developed by these alloys and thus the unusual good physical properties developed by the brazed article utilizing them.

The present invention makes possible the selection of a flux that is most efficacious for brazing alloys of particular and specific compositions that are described in co-pending applications, Ser. No. 328,184 and Ser. No. 341,121. A particular purpose of the present invention is to provide a flux which can be adjusted in composition to provide optimum fluxing action during brazing. The particular flux composition will depend upon the composition of the base metal being brazed. The specificity of the flux of the present invention in effectiveness in removing aluminum containing surface oxides can be increased for alloys of higher aluminum content and decreased for alloys of lower aluminum content.

In order to control the composition of the combined flux of the present invention, it is desirable to mix the substituents of the present brazing flux in a dry form. The materials should be thoroughly mixed and ground together in a mortar and pestle for small quantities or mixed in a suitable powder blender and ground in a ball mill or equivalent piece of equipment for large quantities. When thoroughly mixed, water may be added until the desirable consistency for a particular application is obtained. Any suitable wetting agent may be added to the aqueous mixture to enhance flow or spread of the flux on the work piece.

The present invention will be more readily understood from a consideration of the following illustrative examples.

EXAMPLE I

A weight amount of filler metal (0.83±.01 gram) was placed on a 2″ x 2″ x .025″ coupon of a base metal which had been fluxed by brushing on a uniform coating of the flux which was employed. The assembly was placed in a muffle furnace set at a temperature of 1550° F. for 2½ minutes. The base metal was an aluminum bronze alloy containing 9.5% aluminum, 4.9% iron and the balance essentially copper. The flux employed was a proprietary copper brazing flux containing 10.0% boron, 22.9% potassium, 0.04% magnesium and 26.0% water. The boron was present as borates and oxides. The compound analysis of the flux was as follows: B$_2$O$_3$, 14.0%; KBO$_2$, 59.0%; Mg$_3$(BO$_3$)$_2$, 0.1%; and H$_2$O, 26.9%. The brazing filler metal was a standard 95% Cu, 5% P brazing alloy. No appreciable flow of filler metal was obtained. It was evident from inspection of the specimen that the copper brazing flux employed was ineffective in promoting filler metal flow on the base metal. This was due to the fact that a copper brazing flux does not contain the chemical compounds required to initiate and maintain the electrochemical reaction necessary to remove the refractory aluminum containing oxide which forms on aluminum containing copper alloys.

EXAMPLE II

A flux was made up of 1 part containing about 11% by weight sodium, 31% by weight potassium, 2.3% by weight lithium and 4% by weight zinc, all in the form of halide salts with a compound analysis as follows: NaCl, 26.8%; KCl, 56.9%; LiF, 8.2%; and ZnCl$_2$, 8.1%, and 2 parts containing about 10% by weight boron, 22.9% by weight potassium and 0.04% by weight magnesium, all in the form of borates and oxides, with a compound analysis as follows: B$_2$O$_3$, 14.0%; KBO$_2$, 59.0%; Mg$_3$(BO$_3$)$_2$, 0.1%; and H$_2$O, 26.9% (dry weight basis). The procedure of Example I was repeated and filler metal flow comparable to that obtained on copper using a conventional copper brazing flux was obtained. Similar results were obtained using as filler metal a standard 93% Cu, 7% P brazing alloy. Examination of the specimen showed that the flux of the present invention had been effective in removing the refractory oxide from the aluminum containing copper alloy and allowing the filler metal to flow over and "wet" the surface of the base metal.

EXAMPLE III

A test was made to determine if the flux of this invention would promote filler metal flow on aluminum containing copper alloys to the same extent that conventional fluxes promote flow on copper alloys which do not contain aluminum.

Test specimens 2" x 2" by about .030" thick were prepared from electrolytic tough pitch copper (99.9% Cu) and a copper alloy containing about 10% aluminum and 5% iron. The 99.9% copper specimen was fluxed with the conventional copper brazing flux used in Example I. The aluminum containing copper alloy was fluxed with the flux composition of Example II which is the subject of this invention. Sufficient water was added so that the flux could be conveniently applied and spread on the work piece.

Filler metal as in Example I weighed to 0.83±.01 gms. was placed in the center of each fluxed specimen. The sample was then placed in a muffle furnace controlled at a temperature of 1550°–1600° F. until complete flow of filler metal had occurred as indicated by direct visual observation through an inspection window. The sample was then removed and the resultant filler metal flow compared based on the area covered by the filler metal.

Similar tests were made with three commercial filler metals. These were (1) containing 15.5% Cu, 50% Ag, 15.5% Zn, 16% Cd and 3% Ni; (2) containing 95% Cu and 5% P; and (3) containing 93% Cu and 7% P.

In all cases the flow of filler metal on the aluminum containing copper alloy specimens was equivalent to that obtained on the essentially pure copper alloy.

The results showed that by using the flux of the present invention, aluminum containing copper alloys can be brazed as easily as copper alloys of high purity.

This invention may be embodied in other forms or carried out in other ways without departing from the spirit or essential characteristic thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A brazing flux consisting essentially of: from 10 to 70 percent by weight of at least one alkali metal halide; from 0.4 to 10 percent by weight of a zinc halide; from 4 to 20 percent by weight of boron oxide; and from 20 to 75 percent by weight of potassium borate.

2. A brazing flux consisting essentially of:
   (A) sodium halide in an amount from 2 to 21 percent by weight;
   (B) potassium halide in an amount from 5 to 42 percent by weight;
   (C) lithium halide in an amount from 0.4 to 10 percent by weight;
   (D) zinc halide in an amount from 0.4 to 10 percent by weight;
   (E) boron oxide in an amount from 4 to 20 percent by weight; and
   (F) potassium borate in an amount from 20 to 75 percent by weight.

3. A brazing flux according to claim 2 wherein said sodium halide, potassium halide and zinc halide are provided in the form of the chloride salts and wherein said lithium halide is provided in the form of the fluoride salt.

4. A brazing flux according to claim 2 containing water.

5. A brazing flux consisting essentially of:
   (A) sodium halide in an amount from 4 to 19 percent by weight;
   (B) potassium halide in an amount from 8 to 39 percent by weight;
   (C) lithium halide in an amount from 1 to 7 percent by weight;
   (D) zinc halide in an amount from 1 to 7 percent by weight;
   (E) boron oxide in an amount from 5 to 18 percent by weight; and
   (F) potassium borate in an amount from 25 to 70 percent by weight.

6. A brazing flux according to claim 5 wherein said sodium halide, potassium halide and zinc halide are provided in the form of the chloride salts and wherein said lithium halide is provided in the form of the fluoride salt.

7. A brazing flux according to claim 5 containing water.

8. A process for brazing copper base alloys containing at least 5 percent aluminum which comprises:
   (A) providing at least two copper base alloys to be brazed containing at least 5 percent aluminum;
   (B) forming an assembly by interposing between said alloys a brazing flux consisting essentially of from 10 to 70 percent by weight of at least one alkali metal halide, from 0.4 to 10 percent by weight of a zinc halide, from 4 to 20 percent by weight of boron oxide, and from 20 to 75 percent by weight of potassium borate and a filler metal having a melting point above the melting point of the brazing flux but below the melting point of the base metal;
   (C) placing said assembly into intimate contacting relationship; and
   (D) heating said assembly to a temperature above the melting point of the filler metal but below the melting point of the copper base alloy.

9. A process for brazing copper base alloys containing at least 5 percent aluminum which comprises:
   (A) providing at least two copper base alloys to be brazed containing at least 5 percent aluminum;
   (B) forming an assembly by interposing between said alloys a brazing flux consisting essentially of sodium halide from 2 to 21 percent by weight, potassium halide from 5 to 42 percent by weight, lithium halide from 0.4 to 10 percent by weight, zinc halide from 0.4 to 10 percent by weight, boron oxide from 4 to 20 percent by weight and potassium borate from 20 to 75 percent by weight and a filler metal having a melting point above the melting point of the brazing flux but below the melting point of the base metal;
   (C) placing said assembly into intimate contacting relationship; and
   (D) heating said assembly to a temperature above the melting point of the filler metal but below the melting point of the copper base alloy.

10. A process for brazing copper base alloys containing at least 5 percent aluminum which comprises:
    (A) providing at least two copper base alloys to be brazed containing at least 5 percent aluminum;
    (B) forming an assembly by interposing between said alloys a brazing flux consisting essentially of sodium chloride from 2 to 21 percent by weight, potassium chloride from 5 to 42 percent by weight, lithium fluoride from 0.4 to 10 percent by weight, zinc chloride from 0.4 to 10 percent by weight, boron oxide from 4 to 20 percent by weight, and potassium borate from 20 to 75 percent by weight and a filler metal having a melting point above the melting point of the brazing flux but below the melting point of the base metal;
    (C) placing said assembly into intimate contacting relationship; and
    (D) heating said assembly to a temperature above the melting point of the filler metal but below the melting point of the copper base alloy.

11. A process for brazing copper base alloys containing at least 5 percent aluminum which comprises:

(A) providing at least two copper base alloys to be brazed containing at least 5 percent aluminum;
(B) forming an assembly by interposing between said alloys a brazing flux consisting essentially of sodium halide from 4 to 19 percent by weight, potassium halide from 8 to 39 percent by weight, lithium halide from 1 to 7 percent by weight, zinc halide from 1 to 7 percent by weight, boron oxide from 5 to 18 percent by weight, and potassium borate from 25 to 70 percent by weight and a filler metal having a melting point above the melting point of the brazing flux but below the melting point of the base metal;
(C) placing said assembly into intimate contacting relationship; and
(D) heating said assembly to a temperature above the melting point of the filler metal but below the melting point of the copper base alloy.

12. A process for brazing copper base alloys containing at least 5 percent aluminum which comprises:
(A) providing at least two copper base alloys to be brazed containing at least 5 percent aluminum;
(B) forming an assembly by interposing between said alloys a brazing flux consisting essentially of sodium chloride from 4 to 19 percent by weight, potassium chloride from 8 to 39 percent by weight, lithium fluoride from 1 to 7 percent by weight, zinc chloride from 1 to 7 percent by weight, boron oxide from 5 to 18 percent by weight, and potassium borate from 25 to 70 percent by weight and a filler metal having a melting point above the melting point of the brazing flux but below the melting point of the base metal;
(C) placing said assembly into intimate contacting relationship; and
(D) heating said assembly to a temperature above the melting point of the filler metal but below the melting point of the copper base alloy.

References Cited
UNITED STATES PATENTS

| | | | |
|---|---|---|---|
| 2,817,894 | 12/1957 | Steinberg | 148—26 |
| 3,175,932 | 3/1965 | Brady | 148—23 |
| 3,175,933 | 3/1965 | Wasserman | 148—26 |

JOHN F. CAMPBELL, *Primary Examiner.*

L. J. WESTFALL, *Assistant Examiner.*